M. DENZINGER.
FAUCET.
APPLICATION FILED FEB. 21, 1914.
1,139,754.
Patented May 18, 1915.
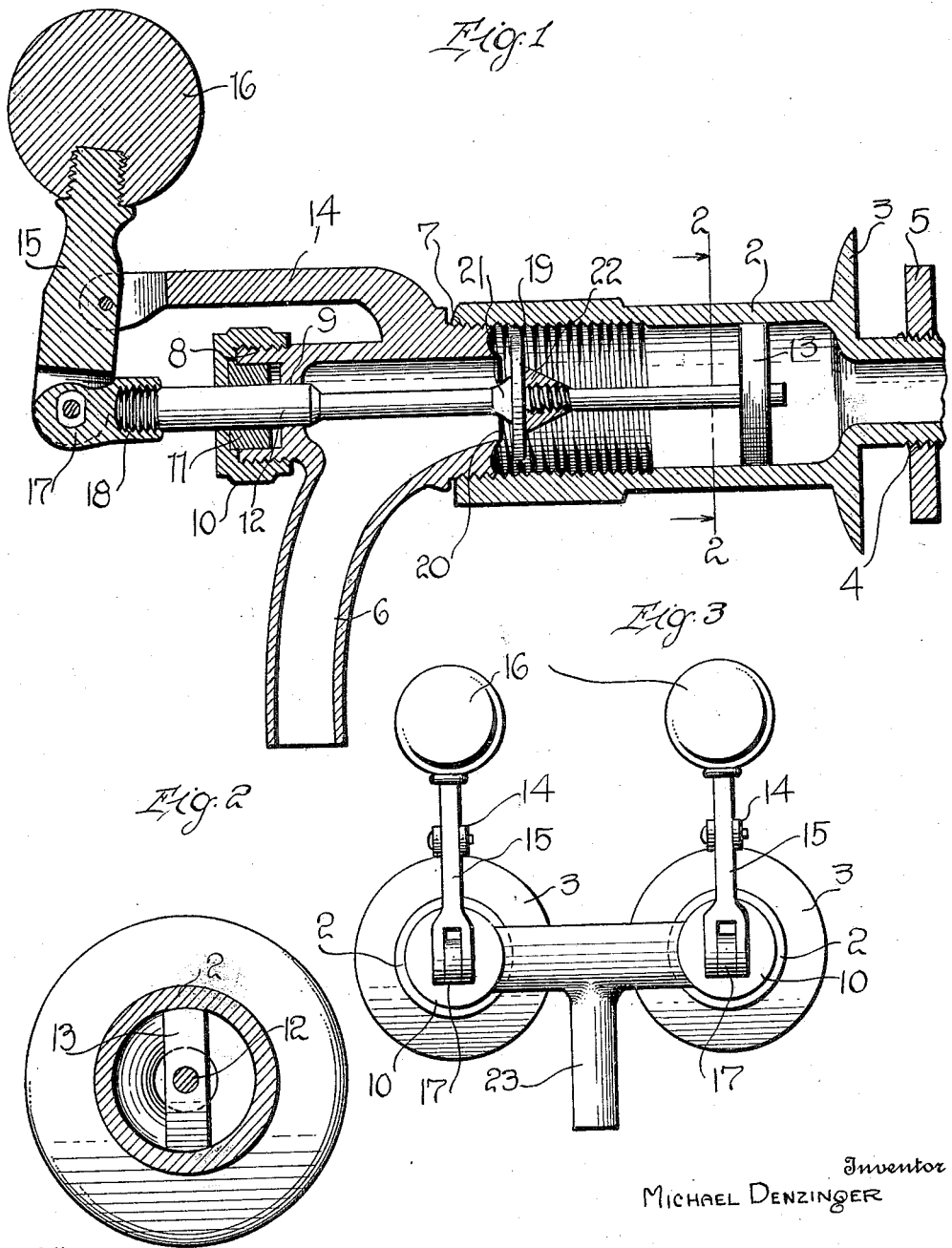
Inventor
MICHAEL DENZINGER

UNITED STATES PATENT OFFICE.

MICHAEL DENZINGER, OF LOUISVILLE, KENTUCKY.

FAUCET.

1,139,754.   Specification of Letters Patent.   Patented May 18, 1915.

Application filed February 21, 1914.   Serial No. 820,271.

*To all whom it may concern:*

Be it known that I, MICHAEL DENZINGER, a citizen of the United States, residing at Louisville, in the county of Jefferson and State of Kentucky, have invented certain new and useful Improvements in Faucets, of which the following is a specification, reference being had to the accompanying drawings.

This invention relates to new and useful improvements in faucets and more particularly to that class of faucets which are adapted to be used for various purposes, the main object of the invention being the provision of a faucet which may be used for drawing liquids from receptacles, attached to a wash stand, bath tub, sink, coil box for beer, and drinking fountains or for similar purposes.

Another object of the invention is the provision of a faucet of the above character wherein the valve within the faucet is automatically closed by the pressure of the liquid upon the release of the operating handle.

Another object of the invention is the provision of a faucet of this character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claim.

In the accompanying drawing forming a part of this application, Figure 1 is a longitudinal sectional view of a faucet constructed in accordance with my invention. Fig. 2 is a transverse sectional view taken on the line 2—2, Fig. 1; and Fig. 3 is a front elevation illustrating a double faucet.

My improved faucet as herein shown and described, is preferably formed in two detachably connected sections, the outer section being generally indicated by the numeral 1 and the inner section by the numeral 2. The inner section 2 is in the form of a cylinder having at its inner end the annular flange 3 which is adapted to abut against the outer face of a barrel or other receptacle, when the threaded stem 4 has been engaged within the bung hole of the barrel or other receptacle to securely retain the faucet in an upright position. The threaded stem 4 upon being inserted within the bung hole of the receptacle, will engage with the nut 5 which is arranged upon the interior of the receptacle (not shown), said nut securely holding the stem 4 against longitudinal movement when in position, so as to prevent the faucet from being accidentally pulled away from the receptacle.

The outer section 1 is provided with a downwardly projecting spigot 6 which is adapted to communicate with the interior of the section and the interior of the cylindrical section 2. It will be apparent from the accompanying drawings, that the interior of the cylinder 2 is threaded and adapted to be removably engaged with the inner end of the section 1, said section being reduced and provided with screw threads, as indicated at 7. The forward end of the section 1 is provided with an exteriorly threaded sleeve 8 which opens into the interior of the section 1 through the reduced opening 9 and threaded upon the sleeve 8 is a perforated cap 10 which is adapted to retain the packing 11 in its operative position, said packing being arranged around the rod 12 which is mounted for reciprocatory movement within the outer section 1. It will be apparent from the accompanying drawing that the opening 9 is of substantially the same diameter as the rod 12 so that the same may form a suitable guide for the rod, the inner end of said rod being slidably mounted within the transverse guide member 13 arranged within the cylinder 2.

Arranged in longitudinal alinement with the body of the section 1 is a supporting arm 14 upon the outer end of which is pivotally mounted the operating lever 15, said lever having removably secured to its outer end a handle member 16 and the lower end of said lever being pivotally connected to the outer end of the rod 12 by means of the connecting member 17. The inner end of the connecting member 17 is provided with an interiorly threaded socket as indicated at 18 and is adapted to be removably engaged with the outer end of the rod 12 so that the operating lever 15 may be readily engaged or disengaged with the reciprocating rod 12. Removably secured to the rod 12, is a fiber valve member 19 which is adapted to engage with the valve seat 20 formed upon the inner end of the outer section 1. The valve 19 is held securely in position by means of the annular flange 21 formed on the rod 12 and the threaded cone member 22 which is removably mounted upon the rod.

From the above description taken in connection with the accompanying drawings, it will be readily apparent that I have provided a simple and durable faucet which may be quickly and readily attached to a barrel or other receptacle to draw the liquid contents therefrom. It will be apparent that upon the pivotal movement of the lever 15, the valve 19 may be engaged or disengaged from the seat 20 to open and close the faucet. It will be noted that after the handle 16 has been released, to permit the valve to close, the pressure of the liquid contents against the valve will automatically close the same against the seat. It will be understood, on the other hand, that the valve 19 is to be actuated manually by the handle at all times, instead of allowing the same to automatically close, if desired. It will be apparent that my improved faucet may be quickly and readily connected with the interior of a barrel or the like, or may be connected with a sink, wash stand, bath tub or similar device, by inserting the threaded stem 4 within a suitable opening formed for the purpose and engaging the same with the interiorly threaded nut 5, said nut securely retaining the faucet against any longitudinal movement.

In Fig. 3, I have illustrated a modified form of the invention, wherein two faucet members are connected by means of a single outlet spigot 23, said spigot being preferably in the form of a T, the upper outwardly projecting ends thereof being connected with the forward sections, in any suitable manner so as to provide a suitable communication between the spigot 23 and the interior of the section 1 of both faucets. From this it will be apparent that the single spigot 23 may be readily connected with both the cold and hot water faucets.

It will be apparent from the foregoing description taken in connection with the accompanying drawing, that my improved faucet is extremely simple in construction and can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

A device of the character described comprising detachably connected sections, one of said sections being provided with a discharge, a guide member in the bore of the other section intermediate the length thereof adjacent the inner extremity thereof, the inner end of the first named section provided with a valve seat, a rod disposed within the bores of the connected sections and coacting with the guide member and mounted for reciprocatory movement, the intermediate portion of the rod being provided with an annular shoulder, the peripheral portion of the rod adjacent the shoulder being threaded, a valve disk surrounding the rod and adapted to abut the shoulder, a member in engagement with the threaded portion of the rod to clamp the disk against the shoulder thereof, an arm connected with the first named section intermediate the length thereof and having its major portion arranged in longitudinal alinement with the section and terminating in advance thereof, an operating lever pivotally secured intermediate its length to the outer extremity of the arm, said lever having one extremity pivotally engaged with the outer extremity of the rod.

In testimony whereof I hereunto affix my signature in the presence of two witnesses.

MICHAEL DENZINGER.

Witnesses:
THOMAS GRAF,
KONRAD BEUTHER.